A. M. BATSNER.
CLUTCH CONTROL AND GEAR SHIFTING APPARATUS.
APPLICATION FILED SEPT. 4, 1913.
1,127,581.
Patented Feb. 9, 1915.
6 SHEETS—SHEET 1.
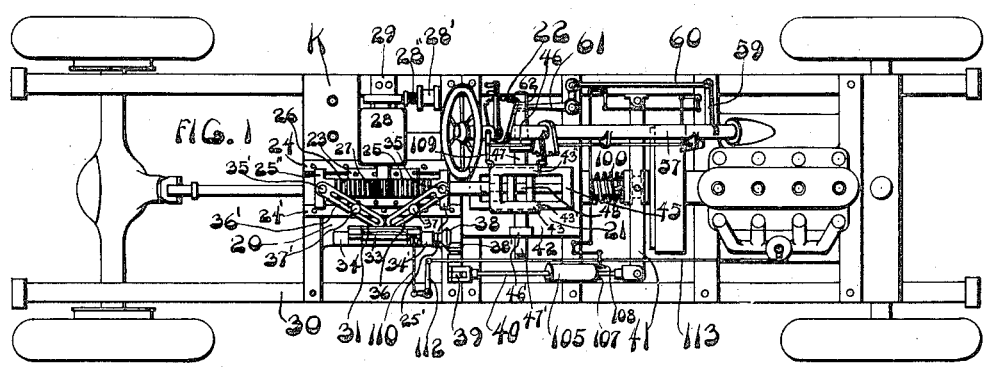
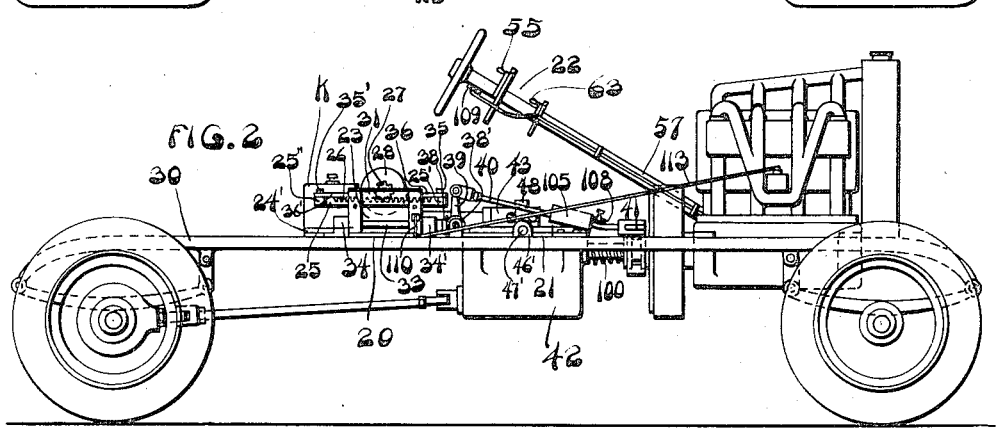
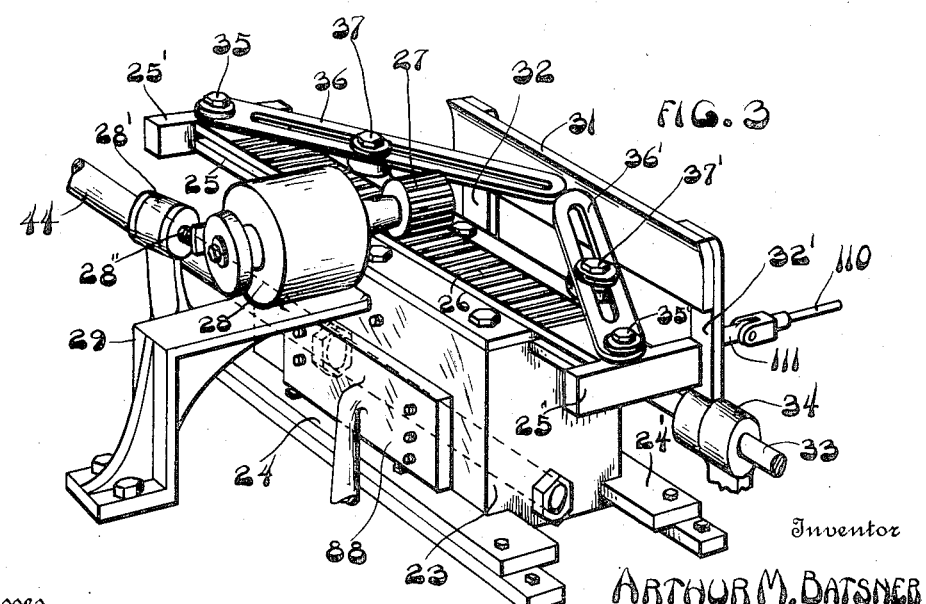
Inventor
ARTHUR M. BATSNER
Witnesses

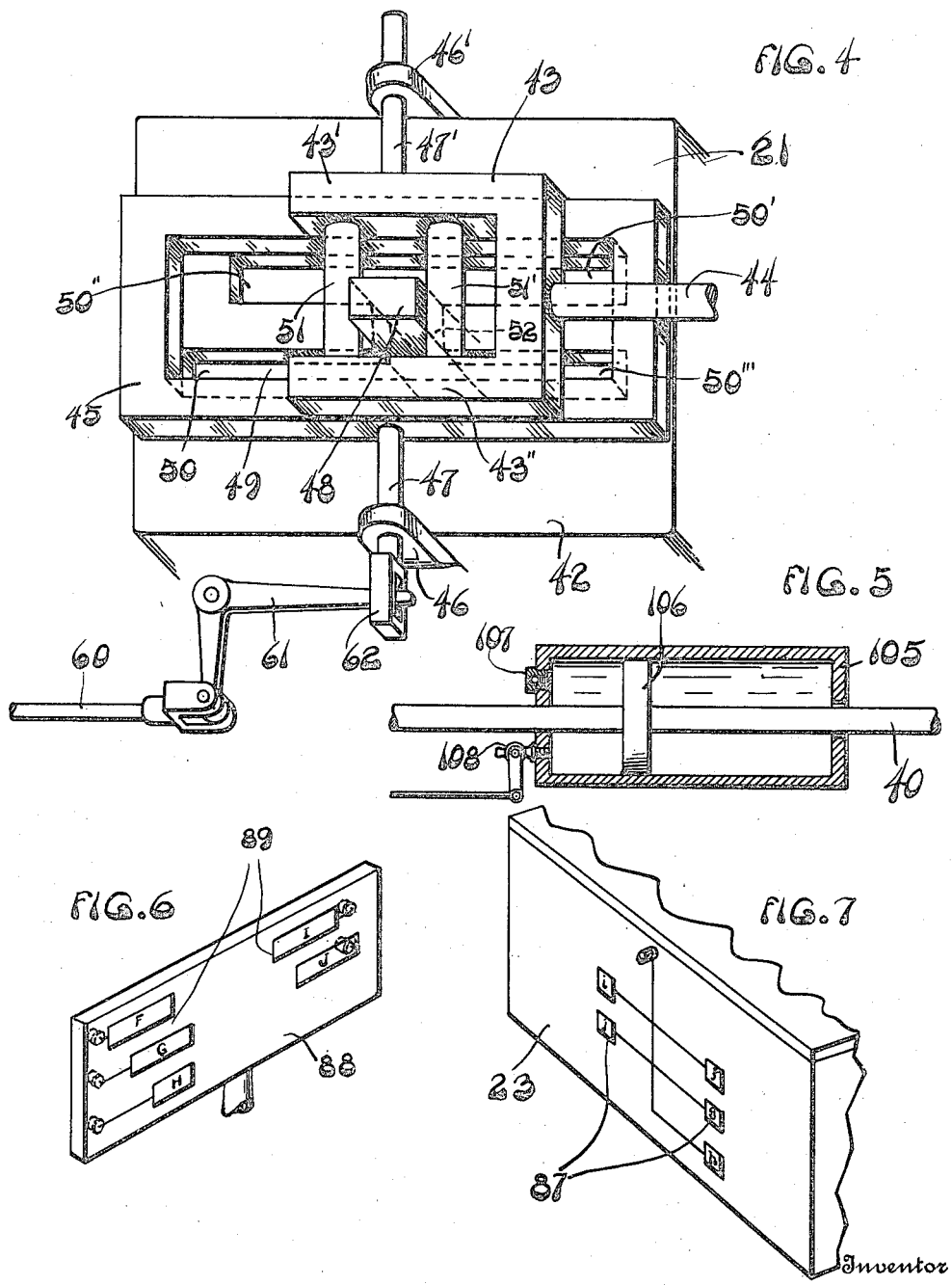

A. M. BATSNER.
CLUTCH CONTROL AND GEAR SHIFTING APPARATUS.
APPLICATION FILED SEPT. 4, 1913.
1,127,581.
Patented Feb. 9, 1915.
6 SHEETS—SHEET 3.
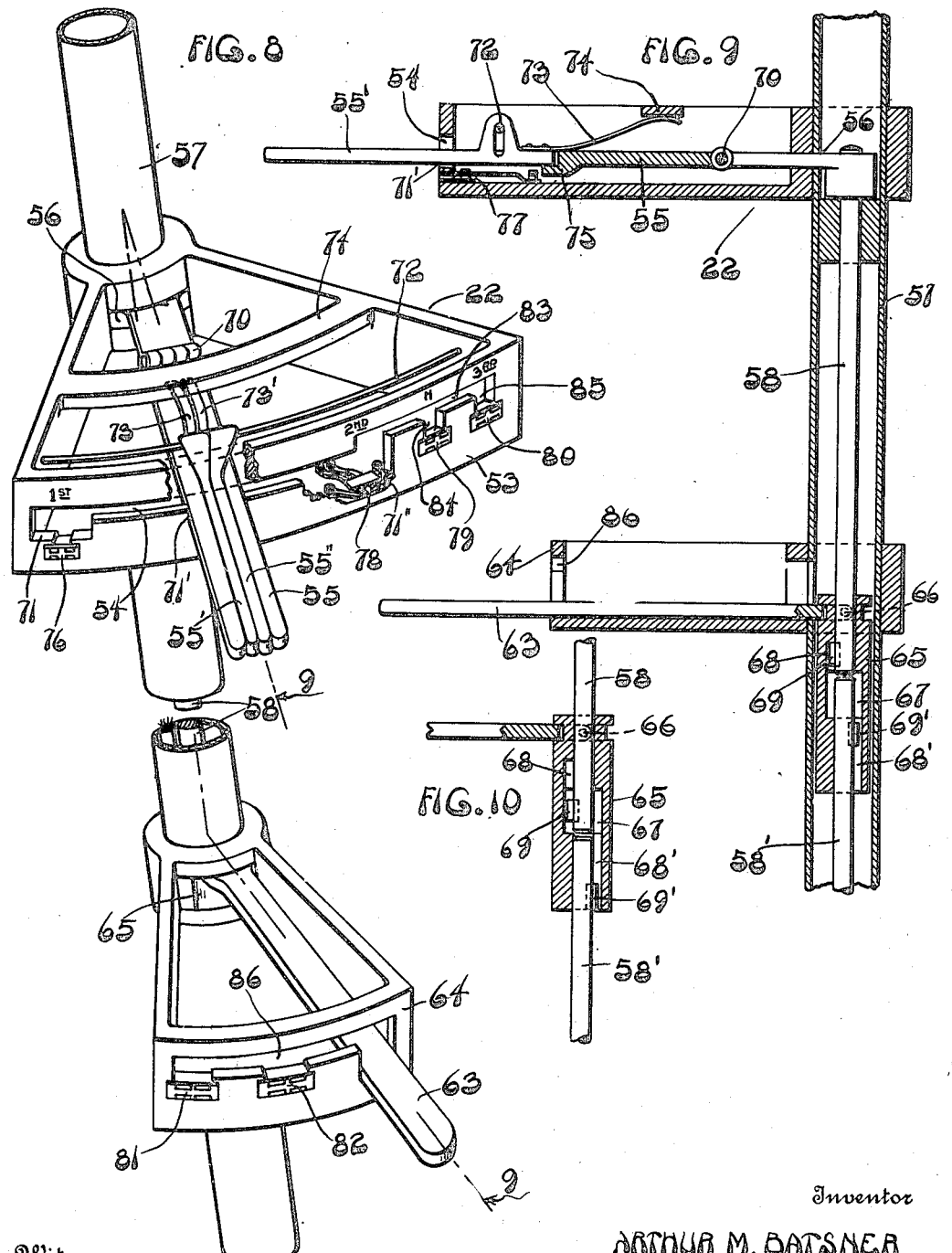
Inventor
ARTHUR M. BATSNER
By Walker F. Murray
Attorney
Witnesses

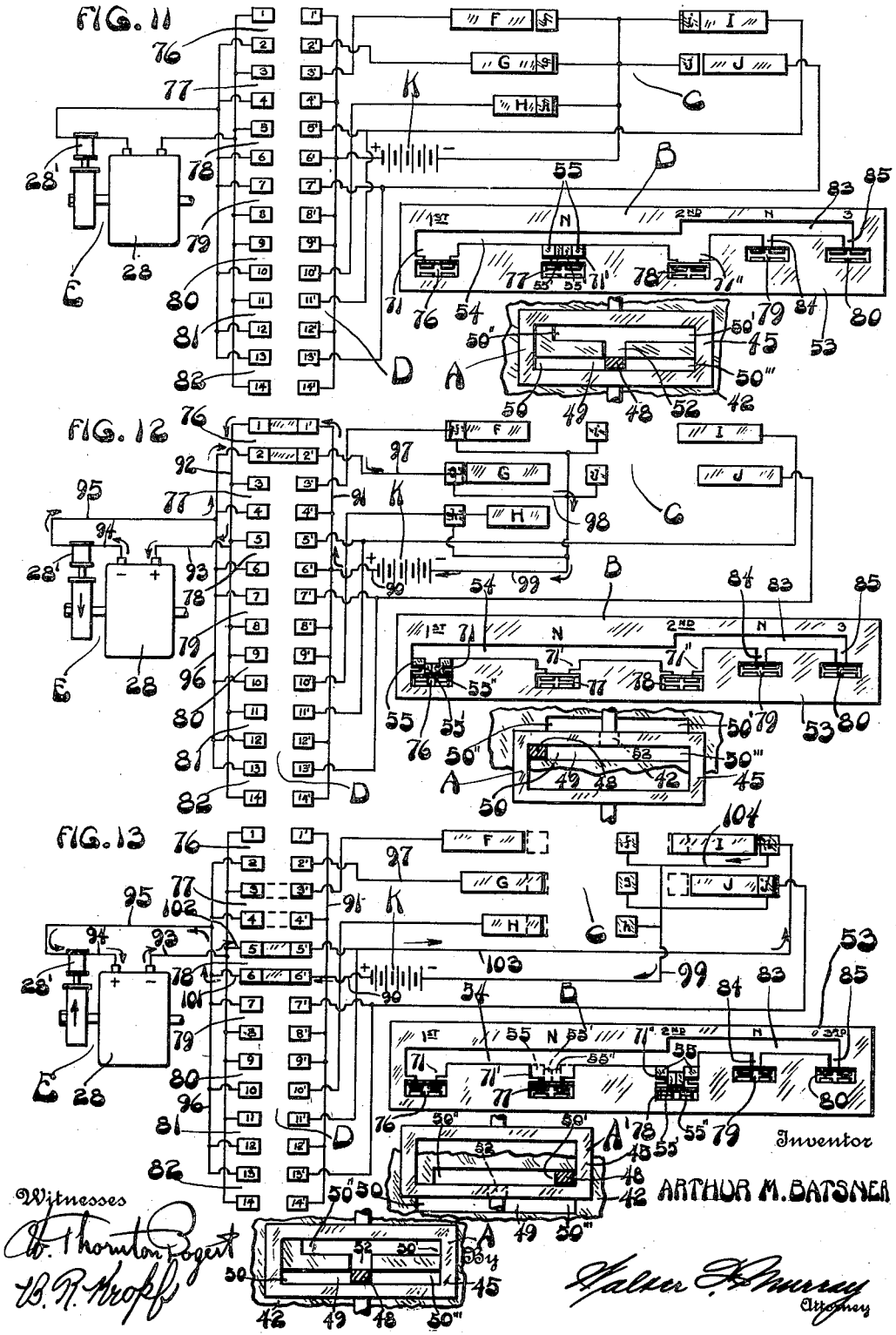

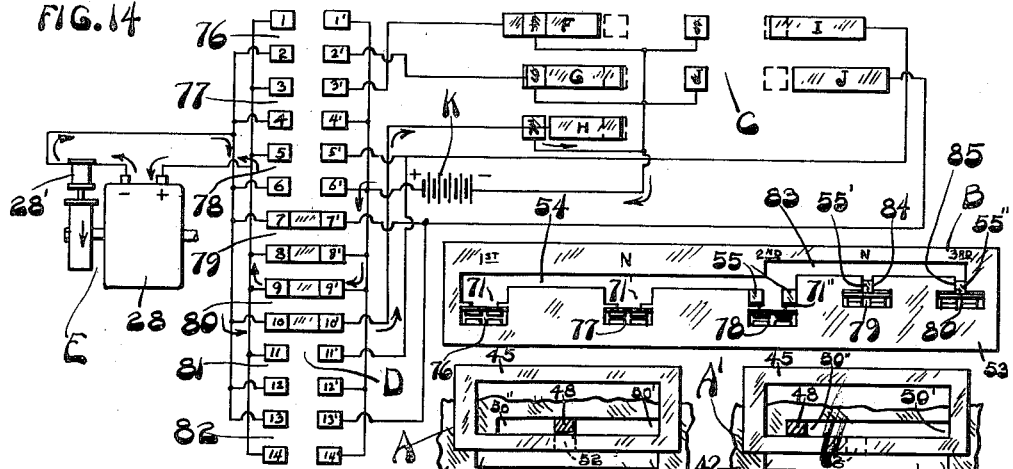
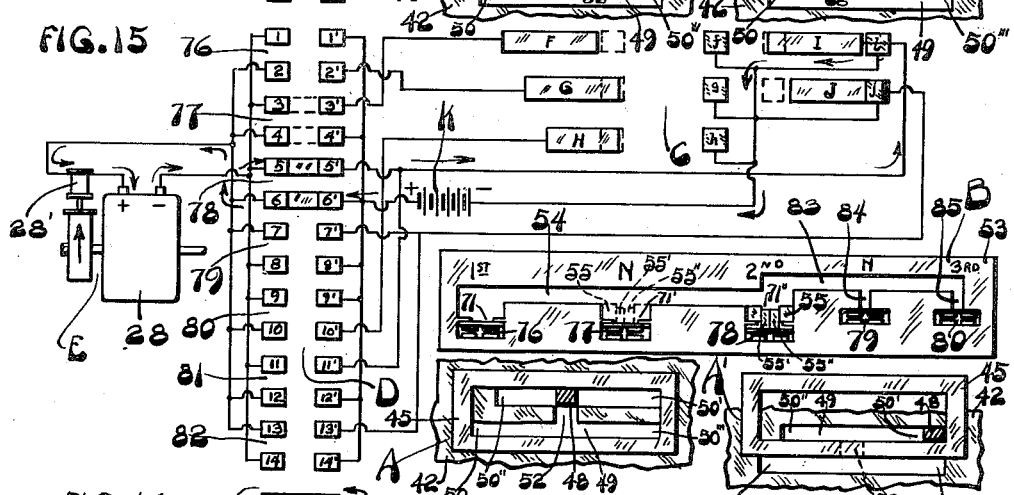
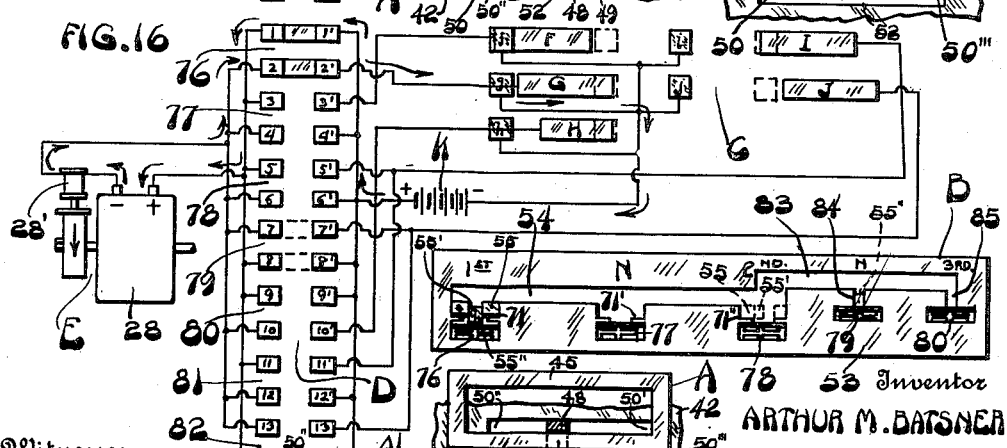

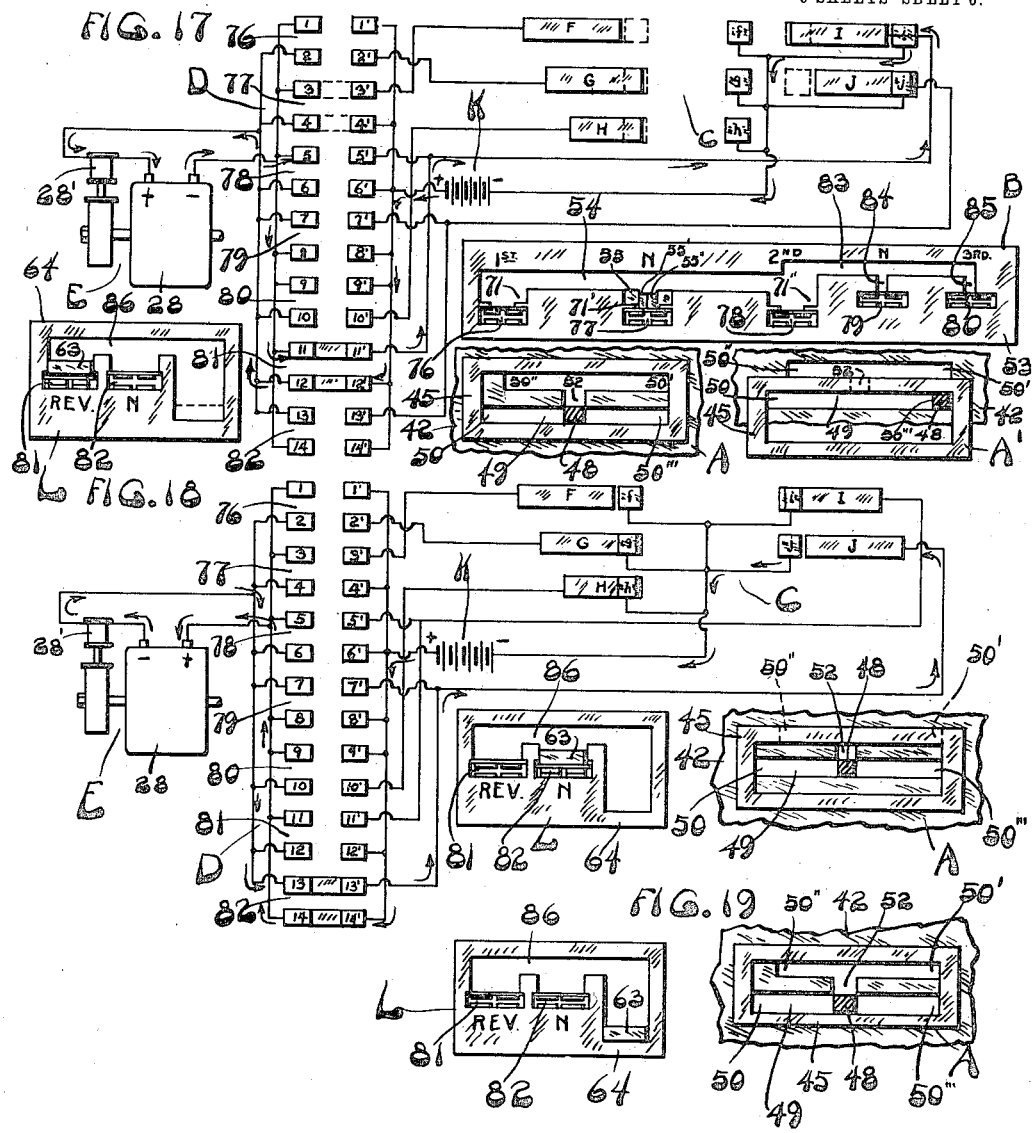

UNITED STATES PATENT OFFICE.

ARTHUR M. BATSNER, OF DAYTON, OHIO.

CLUTCH-CONTROL AND GEAR-SHIFTING APPARATUS.

1,127,581. Specification of Letters Patent. Patented Feb. 9, 1915.

Application filed September 4, 1913. Serial No. 788,049.

*To all whom it may concern:*

Be it known that I, ARTHUR M. BATSNER, a citizen of the United States of America, and resident of Dayton, county of Montgomery, and State of Ohio, have invented certain new and useful Improvements in Clutch-Control and Gear-Shifting Apparatus, of which the following is a specification.

This invention relates to improvements in clutch-control and gear-shifting apparatus.

My invention is characterized by the fact that the clutch-releasing and engaging mechanism is automatically controlled by the shifting of a semi-automatic electrically controlled gear-shifting device.

An object of my invention is a gear-shifting device adapted for use in connection with gear transmission mechanisms of the type ordinarily employed in automobiles, which may be manipulated more simply.

A further object is a change-speed operating device, wherein the clutch between the driving and driven members is automatically disengaged, before the gear-change takes place, and is automatically engaged, after the desired gear-change has been made.

A further object is to produce a gear-shifting device, in which the operator is relieved of the annoyance of controlling the operation of the clutch and the driving agent, when changing gears, and yet one in which he may have positive control of the speed with which the clutch takes up the driving power, after the desired gear-change has been made.

I have shown my invention applied to an automobile, merely to illustrate one embodiment thereof, and desire it to be understood that the application of the device is not limited to motor vehicles, since I contemplate its use in connection with any machines using change-speed mechanisms of similar construction.

In the drawings accompanying and forming a part of this application, Figure 1 is a plan view of an automobile chassis showing mechanism embodying my invention, mounted thereon. Fig. 2 is a side elevation of the machine illustrated in Fig. 1. Fig. 3 is a perspective view of the electrically operated clutch-control and gear-shifting mechanism of my invention. Fig. 4 is a fragmental perspective plan view of the change-speed gear box, with the gear-shifting mechanism shown in position thereon. Fig. 5 is a sectional view of the clutch dash pot and the clutch-engaging control device. Figs. 6 and 7 are fragmental detail perspective views of the contact plates used in the electric control system. Fig. 8 is a fragmental perspective view of the steering column control-mechanism. Fig. 9 is a sectional elevation, taken along the line 9—9 of Fig. 8. Fig. 10 is a detail sectional view of a portion of the apparatus illustrated in Fig. 9, but showing the apparatus in different relative operating positions. Figs. 11 through 18 are composite views diagrammatically illustrating the electric control-system, showing elevations of a sector plate and the various changes through which the parts of the control-system pass in stepping up from the neutral or no-gear position to the high gear position, and then down through neutral position, into reverse gear and back to neutral. Fig. 19 is a composite view, illustrating a front elevation of the sector plate of the reverse control-device, showing the neutral position of the reverse control switch lever, together with a fragmental plan view of the gear box, showing the neutral position of the gear-shift lever and of the link which aids in controlling the gear-shift lever.

The apparatus consists of an electrically operated and controlled combined clutch-operating and gear-shifting device 20, which is connected with an intermediate mechanism 21, directly connected with the gear-shift lever for operating same, and a combined mechanical and electrical device 22, located on the steering column of the machine, for controlling the operation of the two previously mentioned devices.

In the apparatus shown, the clutch-operating and gear-shifting device 20 is mounted upon the vehicle immediately behind the change-speed gear box, and consists of a main slide member 23, reciprocally mounted on guide bars 24, 24'. On the main slide 23, primary slide member 25 is reciprocally mounted. This slide is provided with headed ends 25', 25'', for engaging the ends of the main slide at either end of its sliding movement, and to cause the main slide to be carried along with it over its guide bars. Primary slide 25 is provided on its upper face with rack 26, which engages the pinion 27 of an electric motor 28. The motor is mounted on a suitable support, such as a bracket 29, secured to the chassis 30 of the car, and is provided with an electro-magnetically operated brake 28' connected in series in the motor circuit. Adjacent to the slides 23 and 25, a clutch-operating plate 31 is mounted on arms 32, 32'. These arms are secured to a shaft 33, rotatably mounted in bearings 34, 34', on the frame of the device.

Rotatably mounted on pins 35, 35', secured in each end of the primary slide 25, are slotted links 36, 36', respectively, the slots of the respective links engaging the pins 37, 37', located to one side of the slide 25 and secured to each end of the main slide 23, as shown. The free end of each one of the links being adapted to alternately swing outwardly, when the slide 25 moves in first one direction and then in the other, will engage and push plate 31 outwardly, the end of the link at the same time moving across the surface of the plate, as the slide moves. This outward movement of the link ceases when one or the other of the heads 25', 25", of the primary slide, engages the main slide 23. The outward movement of the plate causes partial rotation of the shaft 33, and through bevel gears 38, 38', operates an arm 39, which is connected with a rod 40, connected with the clutch-operating lever 41.

By electrically controlling motor 28 to operate in one direction or the other, as hereinafter described, the operator can cause slide 25 to reciprocate in one direction or the other, to throw out the clutch between the driving and driven members before each gear shift, and by causing a further movement of the slide to bring an intermediate mechanism 21 into operation to cause a shifting of the gears. This intermediate mechanism 21, (see Fig. 4), consists of a forked arm 43 and a link 45, which is located between the forked arm and the gear box 42. The forked arm is rigidly connected with the main slide 23, by means of a rod 44, which imparts a longitudinal reciprocation to the forked arm. The link 45 is mounted to reciprocate transversely by means of rods 47, 47', passing through bearings 46, 46', formed on each side of the gear box, the rods being secured to the link, as shown in Fig. 4.

The type of gear box selected to be shown in connection with my invention, is that in which the gear-shifting lever 48 extends upwardly through an H-shaped slot 49, and in which the gear lever may be shifted to occupy positions at the ends of each of the branches 50, 50', 50", 50''', of the slot. The gear-changes through which the mechanism passes when the gear lever is shifted to occupy the above mentioned positions are respectively first or low gear, second or intermediate gear, third or high gear, and reverse gear. The forked arm 43 is provided with two pins 51, 51', between which the gear lever 48 is located, and free to move transversely from side to side of the forked arm, through the intermediate portion 52 of the H-slot 49. The distance between the branches 43', 43", of the forked arm is equal to the distance from outside to outside of the H-slot, so that the gear lever is free to occupy either of the branches of the slot. The transverse distance between the inner faces of the sides of the link 45 is likewise equal to the transverse distance from outside to outside of the H-slot and the longitudinal distance between the inner faces of the ends of the link is equal to the overall length of the H-slot.

In order to cause the gear lever to enter the different branches of the H-slot, the link 45 must be moved from one side to the other side of the slot, thereby pushing the gear lever from one longitudinal branch of the slot transversely through the portion 52 to the other longitudinal branch. Reciprocation of the gear lever in the longitudinal branches is effected by the forked arm 43, connected with the main slide 23, by rod 44, as shown in Fig. 3.

The longitudinal movement of the forked arm 43, to throw the gear-shift lever 48 into any one of the gear-change positions, is under electrical control through motor 28 and slides 25 and 23. The transverse movement of link 45 is under mechanical control through a bell crank 61, a rod 60, an arm 59, and a hand lever 55, which forms a part of the combined mechanical and electrical-control device 22. This lever 55 also acts as switch lever for the electrical control of forked arm 43.

I will now describe the control device 22. This device is illustrated in detail in Figs. 8 through 10 inclusive, and comprises a sector-shaped dial member 53, having a slot 54 formed in its face, in which slot a hand lever 55 may reciprocally travel. This lever 55 extends through a slot 56 in the steering column 57 and is rigidly secured to a rod or shaft 58 extending longitudinally within the column and detachably connected by means of a coupling 65 to a similarly located shaft 58'. The shaft 58' is connected at its lower end with an arm 59, (see Fig. 1), which operates through a rod 60 and a bell crank 61, operating in a knuckle 62 on the rod 47, to shift the link 45. The lever 55 is provided near its attached end with a hinged joint 70, which will permit of an up or down movement of the slot-engaging end of the lever 55, so that this end will engage any one of the three notches 71, 71', 71", with which the slot 54 is provided. The end of the lever 55 is bifurcated and two switch-operating fingers 55', 55", are located between the bifurcated ends of the lever to operate electrical switches located in the notches of the slot 54. These fingers are pivotally mounted on a rod 72, secured in each side of the sector casing, as shown in Figs. 8 and 9, and having retaining springs 73, 73', secured to them, which bear against the underside of a bridge 74 formed on the sector casing. A stop 75, formed on the underside of the lever 55, aids the springs 73, 73', in retaining the switch fingers in their normal position.

In each of the notches 71, 71', 71'', are located electric switches 76, 77, 78, while in a branch 83 of the slot 54 are formed notches 84, 85, in which switches 79, 80, are located. The switches 76, 77, 78, are operated by moving the lever 55 together with the switch fingers 55', 55'', to occupy one of the notches 71, 71', 71'', and then by pressing one or both of the fingers to close the switch, thereby completing the respective circuits. The switches 79, 80, however, are operated by allowing the lever 55 to remain in notch 71'', while the fingers are lifted away from the lever and brought into the branch 83 of the slot, so that finger 51' may occupy the notch 84, and the finger 55'' occupy the notch 85. By pressing upon one or both of the fingers, either or both of the switches 79 and 80 may be closed. Adjacent to the hand lever 55 is mounted the reverse operating lever 63 and its sector 64, the reason for so mounting the reverse lever being, to preclude any unintentional manipulation of the lever and a consequently accidental operation of the reverse gears, while the car is moving forward and the lever 55 is being used to control its forward movement. The reverse operating lever is connected with the coupling 65 by means of a yoke 66, and in its normally inoperative position, as shown in Fig. 8, is not affected by the operation of lever 55. When, however, the reverse lever is operated, the coupling 65 is lifted, and as hereinafter described, the shaft 58 and the lever 55 are operatively disconnected from the shaft 58', so that only the reverse lever 63 may operate the link 45. The coupling 65 is in the form of a cylindrical sleeve having an annular recess 67 formed therein, with slots 68, 68', extending on either side of the annular recess. At the end of the shaft 58 a key 69 is placed, it being adapted to enter the slot 68 and to alternately occupy the annular recess 67 or the slot, when the coupling 65 is respectively raised or lowered by the lever 63. A key 69' is placed in the end of the shaft 58', so as to occupy the slot 68' at all times to permit a free reciprocatory movement of the coupling. In the reverse sector 64, switches 81, 82, are similarly located in a slot 86, to be operated by moving the lever 63 to occupy the respective notches of these switches, so that a slight downward movement of the lever will close either switch.

On the side of slide 23 are located a number of electric contact plates 87, as shown in Fig. 7, while on a stationary contact member 88, mounted adjacent to the slide 23, as shown in Fig 3, are mounted a like number of similarly positioned contact plates 89. The slide 23 in moving, causes the plates 87 to move over the plates 89, thereby automatically aiding the hand levers 55 and 63 to control the movements of the mechanism effecting the various gear changes.

Figs. 11 through 18 diagrammatically represent the changes in the electric control system and the positions of the control lever 55, its fingers 55', 55'', and the gear shift lever 48, during and after the operation of shifting from one gear change to another. These figures will be described in sequence in describing the operation of the apparatus, which follows:

Before starting the car, the gear lever 48 must be in the position shown at A in Fig. 11, which is the neutral or no-gear position, and the hand lever 55 must likewise occupy the neutral position, as shown at B, the link 45, therefore, occupying the neutral position, also shown at A. It will be understood that the movement of the lever 48 is caused by the forked arm 43 of the slide 23, but that the showing of this arm and its operating slide 23, in these diagrammatic views, has been omitted for clearness of illustration. However, the relative positions of the contact plates 87 on the slides, with the plates 89 on the stationary member 88 have been shown at C. The switches located in the sectors 53 and 64 are shown diagrammatically at D. The actuating motor 28 and its electro-magnetic brake are shown at E. At C in the figure, the elongated plates F, G, H, I and J represent those mounted on the stationary contact member 88, shown in Fig. 6, while the small plates $f$, $g$, $h$, $i$, and $j$ represent the plates mounted on the slide 23. At D in the figure, the plates 1, 1', 2, 2' represent the contact plates of the switch 76, located on the sector 53; the plates 3, 3', 4, 4' represent the switch 77; the plates 5, 5', 6, 6', represent the switch 78; the plates 7, 7', 8, 8' represent the switch 79, and the plates 9, 9', 10, 10' represent the switch 80. The switch 81 in the reverse lever sector 64, is represented by the plates 11, 11', 12, 12', while its coöperating switch 82 is represented by the plates 13, 13', 14, 14'.

In starting the car, lever 55 is moved from neutral position, shown at B in Fig. 11, to "1st" position, shown at B in Fig. 12. This movement causes link 45 to move from the position shown at A in Fig. 11 to position A shown in Fig. 12. In this position the side of the link prevents the gear lever from entering the portion 52 of the H-slot. The fingers 55', 55'', are now pressed, closing switch 1

76, as shown at D. Closing this switch causes current to flow from the source of electric potential K, through wires 90, 91, plates 1, 1', wires 92, 93, through motor 28, wire 94, through brake 28', which now releases the motor, through wires 95, 96, through plates 2, 2', wire 97, plates G, g, (see Fig. 11 for their starting position), wires 98, 99, to the source K. The motor now operates, causing slide 25 to move over the slide 23, forcing slotted link 36' to move the plate 31 outwardly to withdraw the clutch. The head 25" now engages the slide 23, and while link 36' holds the clutch in a disengaged position, the slide 23 moves to cause a shifting of the gear lever 48 to the "1st" or low gear position. Plates G, g, on slide 23 and member 88 now separate, as shown at C, Fig. 12, breaking the circuit, which causes brake 28' to stop the motor. The clutch members now engage, to enable the engine to drive the car through the low gear. The engagement of the clutch members is caused by a spring 100, (see Fig. 1), which acts to force the clutch members into engagement with one another and to move the lever 41, rod 40, arm 39, gears 38, 38', and plate 31 in the reverse direction. This movement forces the free end of the arm 36' inwardly and moves slide 25 back to its normal position. In moving back, the rack 26, on slide 25, causes a reverse rotation of motor 28. The spring 28" of brake 28' being of much less force than clutch spring 100, permits of the slipping and somewhat restrained reverse movement of the motor.

After the car is well under way on low gear, intermediate or second gear is thrown in by first moving lever 55 to neutral position. (See dotted line position at B, Fig. 13). This causes link 45 to assume position A. Switch 3, 3', 4, 4', is now closed. (See dotted lines at D). This brings plates f, g, h, i and j, as well as gear lever 48, to neutral position. (See C and A respectively). Lever 55 is now moved to "2nd" gear position, causing link 45 to move to position A', and at the same time pushing lever 48 through slot 52 to the shorter elongated portion of the H-slot. Switch 5, 5', 6, 6', is now closed, completing circuit K, 90, 6', 6, 101, 96, 95, 28', 94, 28, 93, 102, 5, 5', 103, I, i, 104, 99 to K. The motor now operates to move lever 48 into second gear position A', Fig. 13. In shifting from second to third or high gear, lever 55 is permitted to remain in second gear position, which does not alter the position of link 45; the fingers 55', 55", are, however, lifted away from lever 55 and moved into slot 83 to occupy notches 84, 85, respectively. By means of finger 55', switch 7, 7', 8, 8', is now closed and gear lever 48 is moved to neutral position A, Fig. 14, in the shorter portion of the H-slot, corresponding to neutral position A, Fig. 11, in the longer portion of the H-slot. Switch 9, 9', 10, 10', is now closed by finger 55" and lever 48 is moved to position A', Fig. 14.

In stepping back from high gear to "2nd" or intermediate, fingers 55', 55", are placed with lever 55 and with it are moved to neutral position. (See dotted lines at B, Fig. 15). This moves link 45 to position A. Switch 3, 3', 4, 4', is now closed by fingers 55', 55", and lever 48 is moved back to neutral position. (See position A). The circuit in this case is the same as that used in moving from "1st" to neutral. Lever 55 is then moved to "2nd" position and switch 5, 5', 6, 6' is closed. The circuit and position of link 45, as well as lever 48, now being the same as those after the first movement of lever 48, when moving from "1st" to "2nd" gear, will cause lever 48 to move to "2nd" gear position.

In shifting from "2nd" to "1st" gears, finger 55" is moved into slot 83 and placed in notch 84. (See dotted lines Fig. 16). The closing of switch 7, 7', 8, 8', by means of finger 55", now moves lever 48 back to neutral position A, Fig. 16, as when passing from "2nd" to "3rd" gears. Then lever 55, with fingers 55', 55", is moved to "1st" gear position. This moves link 45 to position A' and pushes lever 48 into the longer portion of the H-slot through the portion 52. The closing of switch 1, 1', 2, 2', now causes lever 48 to move into "1st" gear position, as shown at A'; the circuit being the same as that described in connection with Fig. 12, when originally moving into "1st" gear. Having now passed from neutral to "3rd" gear and back to "1st" gear, the operator, in order to reverse the motion of the car, must move lever 55 to neutral position, as indicated at B, Fig. 17, and by closing switch 3, 3', 4, 4', restore the operating parts to the positions indicated in Fig. 11, and at A, Fig. 17. Then by means of lever 63, coupling 65, above described, is raised. This movement operatively disengages lever 55 from the shaft 58' and places reverse lever 63 in complete control of the gear-shifting mechanism. Now by moving lever 63 into slot 86 and then placing it in the notch of switch 81, as shown at L, Fig. 17, link 45 is brought to position A'. Plates 11, 11', 12, 12', of this switch are now brought together and the lever 48 is moved into the reverse position A'

In order to place lever 48 once more in neutral position, lever 63 is moved to occupy the notch of switch 82, (see L, Fig. 18). This movement causes link 45 to occupy the position shown at A, and by bringing the plates 13, 13', 14, 14', of this switch together, lever 48 is moved to the position shown at A. By now placing lever 63 in its normal position L, Fig. 19, the link 45 moves to its normal position A, the coupling 65 operatively engages shaft 58′ with shaft 58, and lever 55, and the entire device is again placed in its normal condition ready for a repetition of the above described operations. It will, of course, be understood that previous to each gear-change, the clutch members are disengaged, and that after the change, they are again engaged as set forth in the description of the operation of changing from neutral to first gear.

Means have been provided for regulating the speed of engagement of the clutch members. This means consists of a dash pot 105 mounted on the chassis, and through which the clutch operating rod 40 passes; a piston 106, (see Fig. 5), being mounted on the rod within the dash pot. In the end of the dash pot, adjacent to the clutch, is located a valve 107, which admits air to the dash pot upon withdrawing the clutch, thereby facilitating its withdrawal. Also located in this end of the dash pot is a valve 108, which is connected by means of a system of rods and levers to a handle 109 on the steering column of the machine. This valve is used for the purpose of controlling the discharge of air from the dash pot, thereby enabling the operator to control the rapidity with which the clutch members reëngage each other.

Another feature of my invention is the means for automatically regulating the speed of the engine, when the clutch is released. This means consists of a rod 110, which is connected to a lug 111, (see Fig. 3) on the arm 32′ of the clutch operating mechanism, and a coöperating lever 112 and rod 113, (see Fig. 1), which is connected with the throttle of the engine carbureter and operates to automatically cut down the supply of fuel, when the engine is released by the withdrawal of the clutch, thereby preventing the engine from racing.

Having thus described my invention, what I claim is:

1. In a transmission mechanism, the combination of a driving element and a driven element, a speed-change mechanism located between the driving and driven elements, a device for operating the speed change mechanism, combined manually and electrically operated means for starting the operation of said device, and automatic means for stopping the operation of said device.

2. In a transmission mechanism, the combination of a driving element and a driven element, a housing, a change-speed gear mechanism located in the housing between the driving and driven elements, a lever for shifting the change-speed gears and operating in a slot formed in the housing, means engaging the lever and adapted to move it transversely of the slot, and a second means engaging the lever and adapted to move it longitudinally of the slot.

3. In a shifting-gear transmission mechanism, a gear housing, a gear-shaft lever extending through a slot in the housing, a manually operated means engaging the lever and adapted to move it transversely of the slot, and an electrically operated means engaging the lever and adapted to move it longitudinally of the slot.

4. In a transmission mechanism, the combination of a driving agent and a driven agent, a shifting-gear mechanism located between said agents and connected therewith, means for controlling the operation of the gears of said mechanism, and a second means connected with said first-mentioned means for controlling the driving agent during the operation of shifting the gears of said mechanism.

5. In a transmission mechanism, the combination of a driving member and a driven member, a clutch located between said members, a change-speed apparatus located between said clutch and said driven member, and means for operating said apparatus, said means comprising a main slide movable on ways mounted adjacent to the apparatus and a primary slide, mounted on and movable along ways formed in the main slide, means carried by the primary slide and operatively connected with the main slide for operating the clutch when the slides are moved.

6. In a gear-shift operating device for transmission mechanisms, the combination of means for manually setting and electrically controlling the device, and an electrically actuated mechanism for operating said device and controlled by said means.

7. In a semi-automatic gear-shifting apparatus for transmission mechanisms, the combination of an electrically actuated means for shifting the gears, an electrically released brake for said electrically actuated means, and manually operated levers for electrically controlling the operation of said gear-shifting means and said brake.

8. In a transmission mechanism the combination of a clutch, a shifting-gear mechanism, and means for operating said clutch and said gear mechanism, said means comprising a primary slide and a main slide, means for transmitting movement from the primary slide to the clutch, and means adapted to transmit motion from the primary slide to the main slide following the transmission of movement to the clutch.

9. In a transmission mechanism, the combination of a change-speed gear mechanism, a clutch located adjacent to said gear mechanism, means located adjacent to the gear mechanism and the clutch and adapted to release the clutch and to operate the gear mechanism after the clutch is released, said means comprising a main slide and a primary slide mounted on said main slide, means for starting the operation of the primary slide, and automatic means located adjacent to and connected with the main slide for stopping the operation of both slides.

10. In a transmission mechanism, the combination of a clutch, a shifting-gear mechanism, and means for operating said clutch and shifting-gear mechanism, said means comprising a primary slide and a main slide, means connected with the primary slide for withdrawing the clutch when said slide is first moved, heads on the primary slide to engage the main slide at the end of said first movement and adapted to move the main slide upon further movement of the primary slide, and means connected with the main slide for shifting the gears of said shifting-gear mechanism while the clutch is withdrawn.

11. In a transmission mechanism the combination of a combined clutch-operating and gear-shifting device, and an electrically operated means for controlling the operation of said device.

12. In a transmission mechanism the combination of a gear shifting device, an electric motor, means connecting the motor and the gear-shifting device, and manually operated means for controlling the motor.

13. In a transmission mechanism comprising forward and reverse speed gears, the combination of a gear shifting device, means for controlling the operation of said device in shifting the forward speed gears, and a second means normally connected with said first mentioned means during operation of said first mentioned means, and adapted to be disconnected from said first mentioned means for controlling the operation of said device in shifting the reverse speed gears.

In testimony whereof, I have hereunto subscribed my name this 2nd day of September, 1913.

ARTHUR M. BATSNER.

Witnesses:
WALTER F. MURRAY,
W. THORNTON BOGERT.